US011479200B1

(12) United States Patent
Gao et al.

(10) Patent No.: US 11,479,200 B1
(45) Date of Patent: Oct. 25, 2022

(54) CONSOLE AIRBAG

(71) Applicant: Ford Global Technologies, LLC, Dearborn, MI (US)

(72) Inventors: Zhenyan Gao, Northville, MI (US); Dean M. Jaradi, Macomb, MI (US); Luohui Long, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/359,693

(22) Filed: Jun. 28, 2021

(51) Int. Cl.
*B60R 21/231* (2011.01)
*B60R 21/20* (2011.01)
*B60R 21/2338* (2011.01)
*B60R 21/233* (2006.01)

(52) U.S. Cl.
CPC ........ *B60R 21/23138* (2013.01); *B60R 21/20* (2013.01); *B60R 21/233* (2013.01); *B60R 21/2338* (2013.01); *B60R 2021/23161* (2013.01); *B60R 2021/23386* (2013.01)

(58) Field of Classification Search
CPC . B60R 21/23138; B60R 21/20; B60R 21/233; B60R 21/2338; B60R 2021/23161; B60R 2021/23386
See application file for complete search history.

(56) References Cited

U.S. PATENT DOCUMENTS

| 4,881,754 | A | | 11/1989 | Luitze et al. |
| 5,222,761 | A | | 6/1993 | Kaji et al. |
| 5,836,612 | A | | 11/1998 | Lang |
| 6,966,576 | B1 | * | 11/2005 | Greenstein ........ B60R 21/23138 280/737 |
| 7,360,790 | B2 | * | 4/2008 | Hasebe ............... B60R 21/2338 280/743.2 |
| 7,594,675 | B2 | * | 9/2009 | Bostrom ............... B60R 21/207 280/730.2 |
| 7,631,895 | B2 | * | 12/2009 | Kalliske ............... B60R 21/233 280/743.2 |
| 7,789,422 | B2 | * | 9/2010 | Webber ................. B60R 21/231 280/743.2 |
| 8,210,566 | B2 | * | 7/2012 | Fukawatase .......... B60R 21/231 280/730.2 |
| 8,414,018 | B2 | | 4/2013 | Choi et al. |
| 8,480,123 | B2 | * | 7/2013 | Choi ..................... B60R 21/231 280/730.2 |
| 10,351,092 | B2 | * | 7/2019 | Taguchi ................ B60R 21/231 |
| 10,543,802 | B1 | * | 1/2020 | Makowski ............. B60R 21/20 |
| 10,926,735 | B2 | | 2/2021 | Deng et al. |
| 2008/0129024 | A1 | * | 6/2008 | Suzuki ............. B60R 21/23138 280/743.1 |

(Continued)

FOREIGN PATENT DOCUMENTS

EP 2931420 A1 11/2009

*Primary Examiner* — Paul N Dickson
*Assistant Examiner* — Tiffany L Webb
(74) *Attorney, Agent, or Firm* — Frank A. MacKenzie; Bejin Bieneman PLC (57) ABSTRACT

A vehicle includes an assembly having a middle console and a first airbag and second airbag each supported by and inflatable upwardly from the middle console to an inflated position. The first airbag and the second airbag each have a top distal to the middle console in the inflated position. A tether is external to the first airbag and the second airbag. The tether is connected to the top of the first airbag and the top of the second airbag.

17 Claims, 7 Drawing Sheets

(56) References Cited

U.S. PATENT DOCUMENTS

| | | | |
|---|---|---|---|
| 2009/0001695 A1* | 1/2009 | Suzuki | B60R 21/231 280/730.2 |
| 2020/0062213 A1* | 2/2020 | Gao | B60R 21/013 |

* cited by examiner

CONSOLE AIRBAG

BACKGROUND

Vehicles impact be subject to impact tests to test the movement of vehicle occupants. Such tests may be standardized by various governmental or industry organizations. Some test, for example, measure the movement of vehicle occupants during vehicle impacts that move the vehicle occupants in cross-vehicle directions. These tests include side impact tests and oblique impact tests.

One example of a test that tests cross-vehicle movement of the occupant is the proposed US New Car Assessment Program (USNCAP) test, in which the vehicle is oriented at 15 degrees relative to the moveable deformable barrier and overlaps the moveable deformable barrier at 35%. Other examples are the USNCAP side moveable deformable barrier test and the USNCAP side pole test. These tests measure the inboard motion of the head of the occupant to reduce the Brain Injury Criteria (BrIC). As another example, the European New Car Assessment Program (EuroNCAP) has a test standardized to test the far side protection during side impact. In particular, this test measures inboard motion of the head of the occupant. As another example, the National Highway Traffic Safety Administration (NHTSA) sets forth a standardized test procedure for a side pole crash test, which is designed to simulate a vehicle experiencing a side collision with a pole.

DETAILED DESCRIPTION

With reference to the Figures in which like elements are identified with like numerals, a vehicle 10 includes an assembly 11 having a middle console 12 and a first airbag 14 and second airbag 16 each supported by and inflatable upwardly from the middle console 12 to an inflated position. The first airbag 14 and the second airbag 16 each have a top 20 distal to the middle console 12 in the inflated position. A tether 18 is external to the first airbag 14 and the second airbag 16. The tether 18 is connected to the top 20 of the first airbag 14 and the top 20 of the second airbag 16.

During a vehicle impact, a vehicle occupant 22 may be urged cross-vehicle toward the middle console 12. Since the first airbag 14 and the second airbag 16 are inflatable upwardly from the middle console 12, the first airbag 14 and the second airbag 16 can control the kinematics of the occupant 22 during impact. As one example, in a far side impact where the vehicle occupant 22 is urged toward the middle console 12, the first airbag 14 and the second airbag 16 act against the cross-vehicle movement of the occupant 22. The tether 18 stabilizes the first airbag 14 and the second airbag 16 during impact. The tether 18 prevents the first airbag 14 and the second airbag 16 from separating during impact. Because the first airbag 14 and the second airbag 16 are stabilized by the tether 18 during impact, the first airbag 14 and the second airbag 16 act as a reaction surface against each other during impact.

A vehicle 10 may be any suitable type of ground vehicle, e.g., a passenger or commercial automobile such as a sedan, a coupe, a truck, a sport utility, a crossover, a van, a minivan, a taxi, a bus, etc. The vehicle 10 may be an autonomous vehicle. For the purposes of this disclosure, autonomous operation means that the vehicle 10 may be driven without constant attention from the driver, i.e., the vehicle 10 may be self-driving without human input.

The vehicle 10 may include a first side 24 and a second side 26 spaced from each other in the cross-vehicle direction. The sides 24, 26 of the vehicle 10 may be elongated in the vehicle 10 fore-and-aft direction. Each side 24, 26 of the vehicle 10 may be similar or identical to each other.

The vehicle 10 may include a vehicle body (not numbered). The vehicle body defines a passenger cabin 28 to house occupants 22, if any, of the vehicle 10. The passenger cabin 28 may extend across the vehicle 10, i.e., from one side to the other side of the vehicle 10. The passenger cabin 28 includes a front end 30 and a rear end 32 with the front end 30 being in front of the rear end 32 during forward movement of the vehicle 10. The passenger cabin includes a floor 40.

The vehicle 10 includes one or more seats. As shown in the Figures, the seats are positioned in the passenger cabin 28. The seats may be arranged in the passenger cabin 28 in any suitable position, i.e., as front seats, rear seats, third-row seats, etc. Specifically, the vehicle 10 may include a first seat 34 and a second seat 36. The first seat 34 and the second seat 36 may be spaced each other. In the example shown in the Figures, the first seat 34 and the second seat 36 are front seats. In another example, not shown in the Figures, the first seat 34 and the second seat 36 may be rear seats. The seats may be movable relative to the floor 40 to various positions, e.g., movable fore-and-aft and/or cross-vehicle. The seats may be of any suitable type, e.g., a bucket seat, as shown in the Figures, a bench seat, etc.

The seat includes a seatback 38 and a seat bottom (not numbered). The seatback 38 may be supported by the seat bottom and may be stationary or movable relative to the seat bottom. The seatback 38 and the seat bottom may be adjustable in multiple degrees of freedom. Specifically, the seatback 38 and the seat bottom may themselves be adjustable, in other words, adjustable components within the seatback 38 and/or the seat bottom, and/or may be adjustable relative to each other.

The seatback 38 and the seat bottom may include each include a frame (not numbered) and a covering (not numbered) supported on the frame. The frame may be of any suitable plastic material, e.g., carbon fiber reinforced plastic (CFRP), glass fiber-reinforced semi-finished thermoplastic composite (organosheet), etc.; any suitable metal such as steel, aluminum, etc.; etc. The covering may include upholstery and padding. The upholstery may be cloth, leather, faux leather, or any other suitable material. The upholstery may be stitched in panels around the frame. The padding may be between the covering and the frame and may be foam or any other suitable material.

Figure 3:
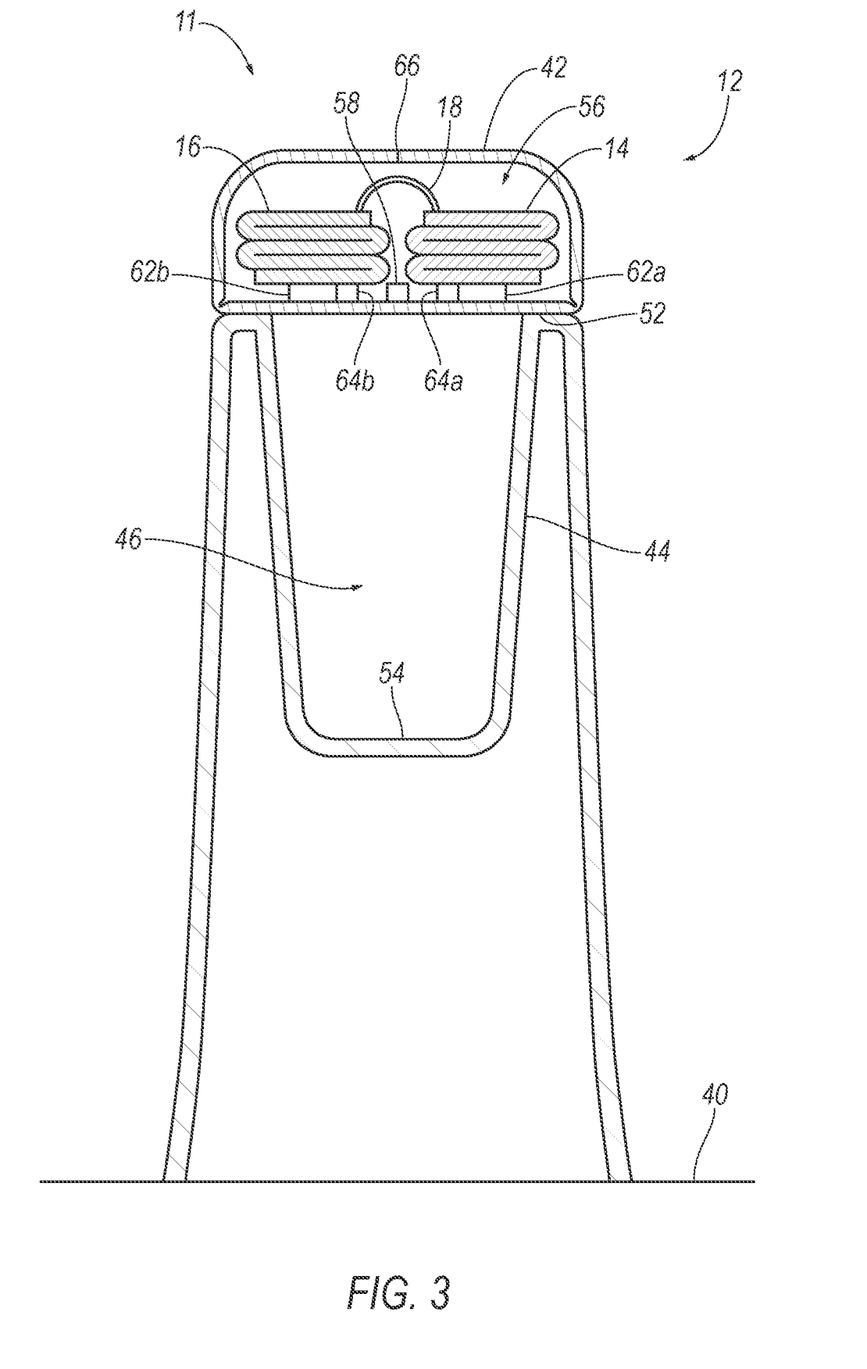
FIG. 3 is a cross-sectional view of the middle console in FIG. 2.
Figure 4A:
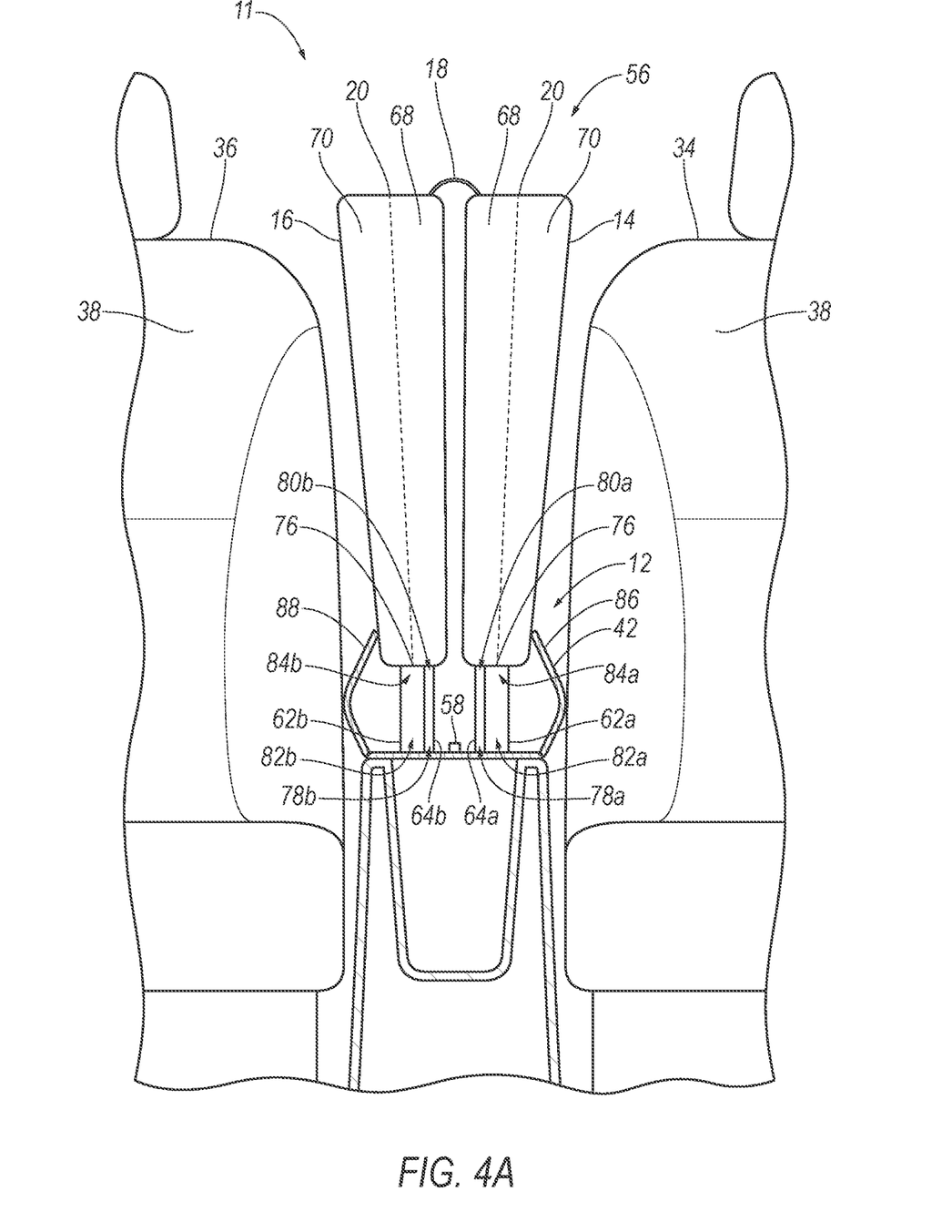
FIG. 4A is a front view of an airbag assembly partially inflated.
Figure 4B:
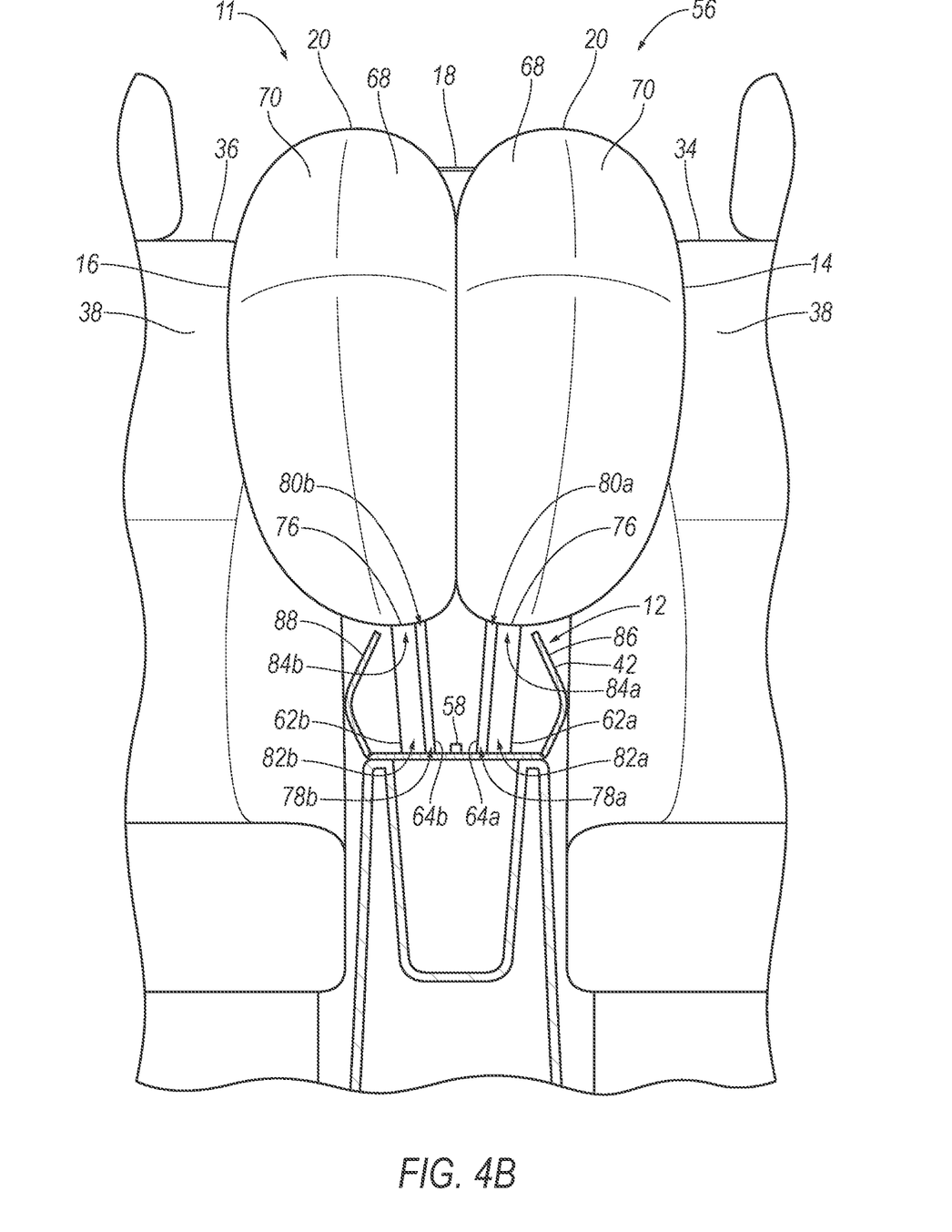
FIG. 4B is the front view of the airbag assembly from FIG. 4B in the inflated position.

As shown in the Figures, the middle console 12 may be between the first seat 34 and the second seat 36. As shown in FIG. 3, the middle console 12 may be supported by the floor 40. Specifically, the middle console 12 may extend upwardly from the floor 40 between the first seat 34 and the second seat 36. As another example, not shown, where the vehicle 10 includes a bench seat the middle console 12 may be supported by the seat. The middle console 12 is in the middle of two seats. The middle console 12 may be at the center of the vehicle 10 in a cross-vehicle direction, as shown in the Figures. In other examples, the middle console 12 may be in the middle of two adjacent seats and offset from the center of the vehicle 10 in the cross-vehicle direction.

The middle console 12 may include an armrest 42. The armrest 42 is designed to support the arm of an occupant 22 of the vehicle 10, e.g., an occupant 22 seated in one of the seats. Specifically, the armrest 42 is sized, shaped, and positioned to support the arm of the occupant 22.

The middle console 12 may include a base that supports the armrest 42. For example, the middle console 12 may include a storage compartment 44 below the armrest 42. In such an example, the armrest 42 is moveably attached to the storage compartment 44. The storage compartment 44 may include a cavity 46 that can be used to store items, e.g., personal items belonging to a vehicle occupant 22. The armrest 42 may be selectively moveable to cover and uncover the cavity 46, e.g., the armrest 42 is a lid of the storage compartment 44, to allow access to the storage cavity 46 of the storage compartment 44. The middle console 12 may also include cup holders and vehicle controls, e.g., a gear shifter, window controls, HVAC controls, multimedia controls, etc.

The middle console 12 has a midline M. In the example shown in the Figures, the midline M divides the middle console 12 along an axis of the middle console 12 parallel to a fore-and-aft axis of the vehicle 10. As shown in the Figures, the first seat 34 is on a first side 86 of the midline M and the second seat 36 is on a second side 88 of the midline M.

The middle console 12 may include a front end 48 and a rear end 50. For example, the armrest 42 may include the front end 48 and the rear end 50. The middle console 12, and specifically the armrest 42, may be elongated on the fore-and-aft axis from the front end 48 to the rear end 50. Specifically, as an example shown in FIGS. 2 and 5, the middle console 12 may be longer on the fore-and-aft axis than on the cross-vehicle axis.

Figure 1:
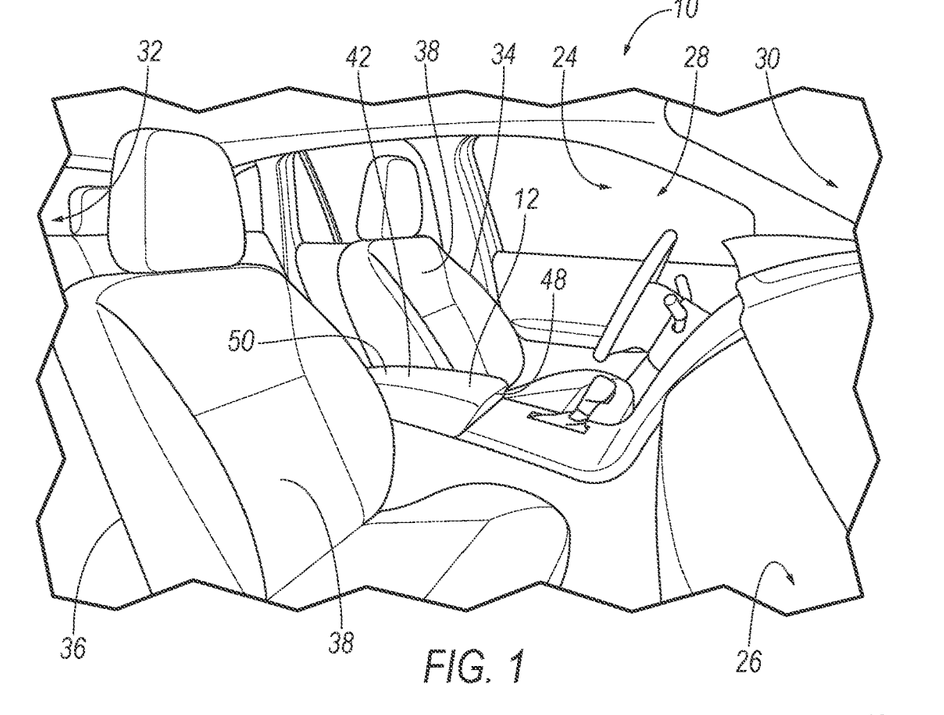
FIG. 1 is a perspective view of a vehicle.
Figure 2:
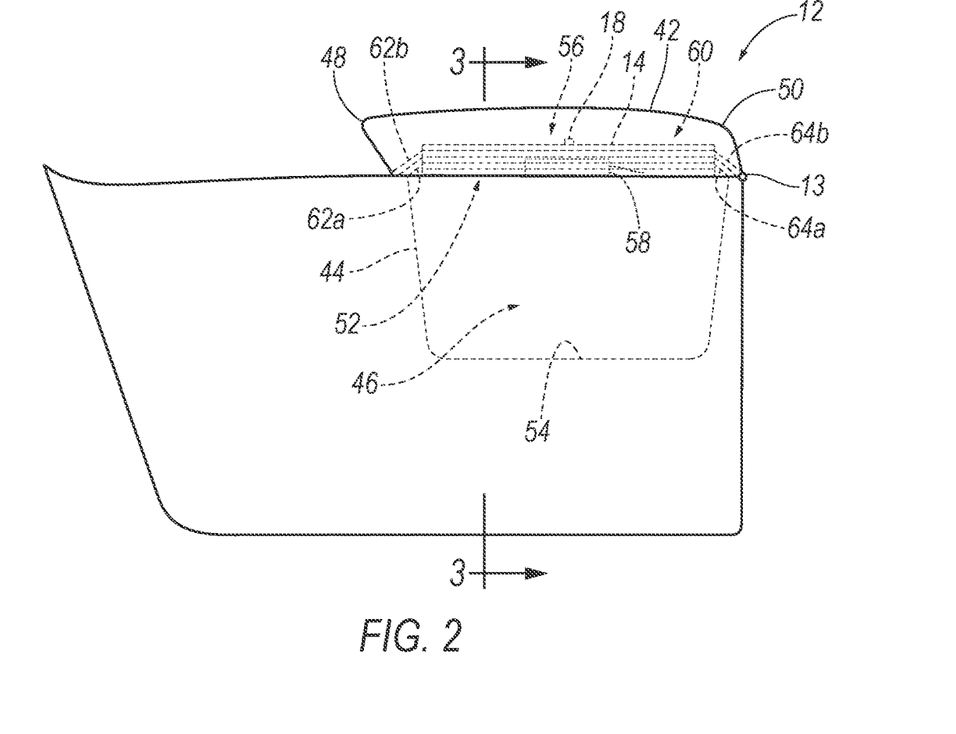
FIG. 2 is a side view of a middle console.

As an example, the storage compartment 44 may be below the armrest 42. In the example shown in the Figures, the storage compartment 44 may be elongated on the fore-and-aft axis. The storage compartment 44 may include a rim 52 and a bottom 54. The storage compartment 44 extends downwardly from the rim 52 to the bottom 54. As shown in FIG. 2, the storage compartment 44 is elongated on the fore-and-aft axis from the front end 48 of the armrest 42 to the rear end 50 of the armrest 42. Specifically, the rim 52 extends from the front end 48 of the armrest 42 to the rear end 50 of the armrest 42. As an example, as shown in FIG. 2, the bottom 54 may extend between the front end 48 and the rear end 50, i.e., the storage compartment 44 is narrower on the fore-aft axis at the bottom 54 relative to the rim 52. In other examples not shown in the Figures, the bottom 54 may extend beyond the front end 48 or the rear end 50, i.e., the storage compartment 44 is longer at the bottom 54 relative to the rim 52.

As set forth above, the armrest 42 is moveably attached to the storage compartment 44. As an example, the armrest 42 may be rotatable relative to the storage compartment 44. In such an example, the middle console 12 may include a hinge 13. The hinge 13 connects the lid to the storage compartment 44. Specifically, the hinge 13 may operatively connect the lid to the storage compartment 44 such that the lid may be selectively rotated relative to the storage compartment 44. As shown in the Figures, the hinge 13 may be at the rear end 50 of the middle console 12. Specifically, the hinge 13 may be connected to the armrest 42 and the storage compartment 44. The armrest 42 may be rotatable about the hinge 13 between a closed position and an open position (not shown). Specifically, the armrest 42 may be rotatable upwardly from the storage compartment 44 about the hinge 13 from the closed position to the open position. In an example in which the middle console 12 is supported on the seat, the middle console 12 may include a second hinge (not shown). In this embodiment, the middle console 12 may be rotatable relative to the seat about the second hinge.

The vehicle includes an airbag assembly 56. The airbag assembly 56 includes the first airbag 14, the second airbag 16, and an inflator 58. The airbag assembly 56 may include an airbag housing 60. The airbag assembly 56 may include one or more external tethers. In the example shown in the Figures, the airbag assembly 56 includes the tether 18, a first front tether 62a, a second front tether 62b, a first rear tether 64a, and a second rear tether 64b, as described further below. The airbag assembly 56 may include any suitable number of tethers including any combination of the tether 18, a first front tether 62a, a second front tether 62b, a first rear tether 64a, and a second rear tether 64b. As one example shown in the Figures, and described further below, the airbag housing 60 may be unitary with the armrest 42. The inflator 58 inflates the airbags 14, 16 to the inflated position, as described further below.

During a far side vehicle 10 impact, the vehicle 10 occupant 22 may be urged toward the middle console 12, specifically, vehicle-inboard. In the example shown in FIG. 5B, during a vehicle 10 impact to the second side 26 the occupant 22 in the first seat 34 is urged toward the second side 26. The first airbag 14 and the second airbag 16 inflate upwardly from the middle console 12 to control the kinematics of the occupant 22. Specifically, the hips of the occupant 22 may impact the middle console 12 and the torso and head of the occupant 22 may impact the first airbag 14. Upon impact the first airbag 14 moves toward the second side 26. The second airbag 16 acts as a reaction surface for the first airbag 14. Accordingly, the first airbag 14 controls the kinematics of the occupant 22. Specifically, in the examples shown in the Figures, the movement of the first airbag 14 is limited by the tether 18, which prevents the second airbag 16 from separating from the first airbag 14 during impact. The second front tether 62b and the second rear tether 64b limit movement of the second airbag 16, which limits movement of the first airbag 14 toward the second side 26. Similarly, the first airbag 14 acts as a reaction surface for the second airbag 16 during a vehicle 10 impact to the first side 24 that urges the occupant 22 in the second seat 36 toward the first side 24.

The first airbag 14 and the second airbag 16 are supported by the middle console 12 and inflatable to the inflated position. As an example, shown in the Figures, the first airbag 14 and the second airbag 16 are inflatable upwardly from the middle console 12. Specifically, the first airbag 14 and the second airbag 16 inflatable upwardly from the armrest 42. The first airbag 14 and the second airbag 16 inflate at the same time from the same location, i.e., the middle console 12. In this example, the armrest 42 may include a tear seam 66. The tear seam 66 is designed to rupture upon inflation of the first airbag 14 and the second airbag 16, i.e., is positioned, sized, has a rupture strength, etc., so that the first airbag 14 and the second airbag 16 break the tear seam 66 when the first airbag 14 and the second airbag 16 are inflated. The tear seam 66 may be weaker than a portion of the armrest 42 adjacent the tear seam 66, e.g., the tear seam 66 may be relatively thinner, a relatively weaker material, etc.

The first airbag 14 and the second airbag 16 may be arranged in a cross-vehicle 10 direction relative to each other. For example, as shown in the Figures, the first airbag 14 may be on the first side 86 of the midline M and the second airbag 16 may be on the second side 88 of the midline M and may be aligned with each other along the axis of the middle console 12. Specifically, the first airbag 14 and the second airbag 16 may be arranged in the cross-vehicle 10 direction in the inflated position and the uninflated position. As described below, the first airbag 14 and the second airbag 16 each include an inboard panel 68 and an outboard panel 70 defining an inflation chamber. During inflation, the inflation chamber expands upwardly and in the cross-vehicle 10 direction. For example, the outboard panels 70 expand away from the midline M toward the sides 24, 26 of the vehicle 10 and the inboard panels 68 abut each other in the inflated position.

As shown in the Figures, the middle console 12 is between the first seat 34 and the second seat 36. The first seat 34 and the second seat 36 are arranged in a cross-vehicle direction relative to each other. Since the first airbag 14 and the second airbag 16 are arranged in a cross-vehicle direction relative to each other, the first airbag 14 and the second airbag 16 are inflatable between the first seat 34 and the second seat 36. In the event of a vehicle impact to the second side 26 of the vehicle 10 as described above, the occupant urges the first airbag 14 into the second airbag 16 and a portion of the second airbag 16 impacts the second seat 36. The second seat 36 acts as a reaction surface for the second airbag 16, which acts as a reaction surface for the first airbag 14.

The first airbag 14 and the second airbag 16 each include the inboard panel 68 and the outboard panel 70. The inboard panel 68 and the outboard panel 70 define the inflation chamber in the inflated position. As shown in the Figures, the inboard panel 68 and the outboard panel 70 may be connected by any suitable manner, e.g., stitching, adhesive, ultrasonic welding, etc. In other examples, the inboard panel 68 and the outboard panel 70 may be unitary. Unitary means a single, uniform piece of material with no seams, joints, fasteners, or adhesives holding it together, i.e., formed together simultaneously as a single continuous unit.

The airbag 14, 16, i.e., the inboard panel 68 and the outboard panel 70, may be fabric, e.g., a woven polymer. As an example, the airbag 14, 16 may be woven nylon yarn, for example, nylon 6, 6. Other examples of woven polymers include polyether ether ketone (PEEK), polyetherketoneketone (PEKK), polyester, etc. The woven polymer may include a coating, such as silicone, neoprene, urethane, etc. For example, the coating may be polyorgano siloxane. The tethers 18, 62*a*, 62*b*, 64*a*, 64*b* may be the same type of material as the airbag 14, 16, e.g., fabric.

The first airbag 14 and the second airbag 16 may each include a front side 72, a rear side 74, the top 20, and a bottom 76. Specifically, the front side 72 is adjacent the front end 48 of the middle console 12, the rear side 74 is adjacent the rear end 50 of the middle console 12, the top 20 is distal the middle console 12, and the bottom 76 is below the top 20 and above the middle console 12. As shown in the Figures, the inboard panel 68 and the outboard panel 70 extend between the front side 72 and the rear side 74 and between the top 20 and the bottom 76. For example, the inboard panel 68 of the first airbag 14 extends from the middle console 12 to the top 20 of the first airbag 14 and the inboard panel 68 of the second airbag 16 extends from the middle console 12 to the top 20 of the second airbag 16.

As shown in the Figures, the inboard panel 68 of the first airbag 14 and the inboard panel 68 of the second airbag 16 face each other and are spaced from each other. Specifically, the inboard panel 68 of the first airbag 14 and the inboard panel 68 of the second airbag 16 may be spaced from each other before reaching the inflated position. The inboard panel 68 of the first airbag 14 and the inboard panel 68 of the second airbag 16 may abut each other in the inflated position.

In an example in which the airbag assembly 56 includes the airbag housing 60, the airbag 14, 16 is supported by the airbag housing 60. The airbag housing 60 houses the airbag in an uninflated position and supports the airbag 14, 16 in the inflated position. The airbag housing 60 may be unitary with the armrest 42, i.e., a single, uniform piece of material with no seams, joints, fasteners, or adhesives holding it together, i.e., formed together simultaneously as a single continuous unit, e.g., by machining from a unitary blank, molding, forging, casting, etc. Non-unitary components, in contrast, are formed separately and subsequently assembled, e.g., by adhesive, welding, etc. In other examples not shown in the Figures, the airbag housing 60 may be separate from the armrest 42 and inserted in the armrest 42 after manufacturing of the armrest 42.

The airbag 14, 16 may be rolled and/or folded to fit within the airbag housing 60 in the uninflated position. As shown in the Figures, in the uninflated position, the first airbag 14 and the second airbag 16 may be packaged in any suitable manner, e.g., a z-fold, accordion fold, etc. As shown in FIG. 2, in the uninflated position the first airbag 14 and the second airbag 16 may be elongated from the front end 48 to the rear end 50 when packaged. The airbag housing 60 may be of any suitable material, e.g., a rigid polymer, a metal, a composite, or a combination of rigid materials.

The inflator 58 is in fluid communication with the first airbag 14 and the second airbag 16. Specifically, the inflator 58 may be in fluid communication with both the first airbag 14 and the second airbag 16. In other words, one inflator 58 may be used to inflate both the first airbag 14 and the second airbag 16. The inflator 58 expands the airbag 14, 16 with inflation medium, such as a gas, to move the airbag 14, 16 from the uninflated position to the inflated position. The inflator 58 may be supported by any suitable component. For example, the inflator 58 may be supported by the housing or the middle console 12. The inflator 58 may be, for example, a pyrotechnic inflator 58 that ignites a chemical reaction to generate the inflation medium, a stored gas inflator 58 that releases (e.g., by a pyrotechnic valve) stored gas as the inflation medium, or a hybrid. The inflator 58 may be, for example, at least partially in the inflation chamber to deliver inflation medium directly to the inflation chamber or may be connected to the inflation chamber through fill tubes, diffusers, etc.

As described above, the tether 18 is connected to the top 20 of the first airbag 14 and the top 20 of the second airbag 16. The tether 18 may include a first end and a second end (not numbered). As shown in the Figures, the first end of the tether 18 is connected to the top 20 of the first airbag 14 and the second end of the tether 18 is connected to the top 20 of the second airbag 16. The tether 18 may terminate at the first end and the second end, i.e., the tether 18 may be connected to the first airbag 14 and the second airbag 16 at terminal ends of the tether 18. The tether 18 is connected to the first airbag 14 and the second airbag 16 in any suitable manner, e.g., sewn, ultrasonic welding, adhesive, etc.

Figure 5A:
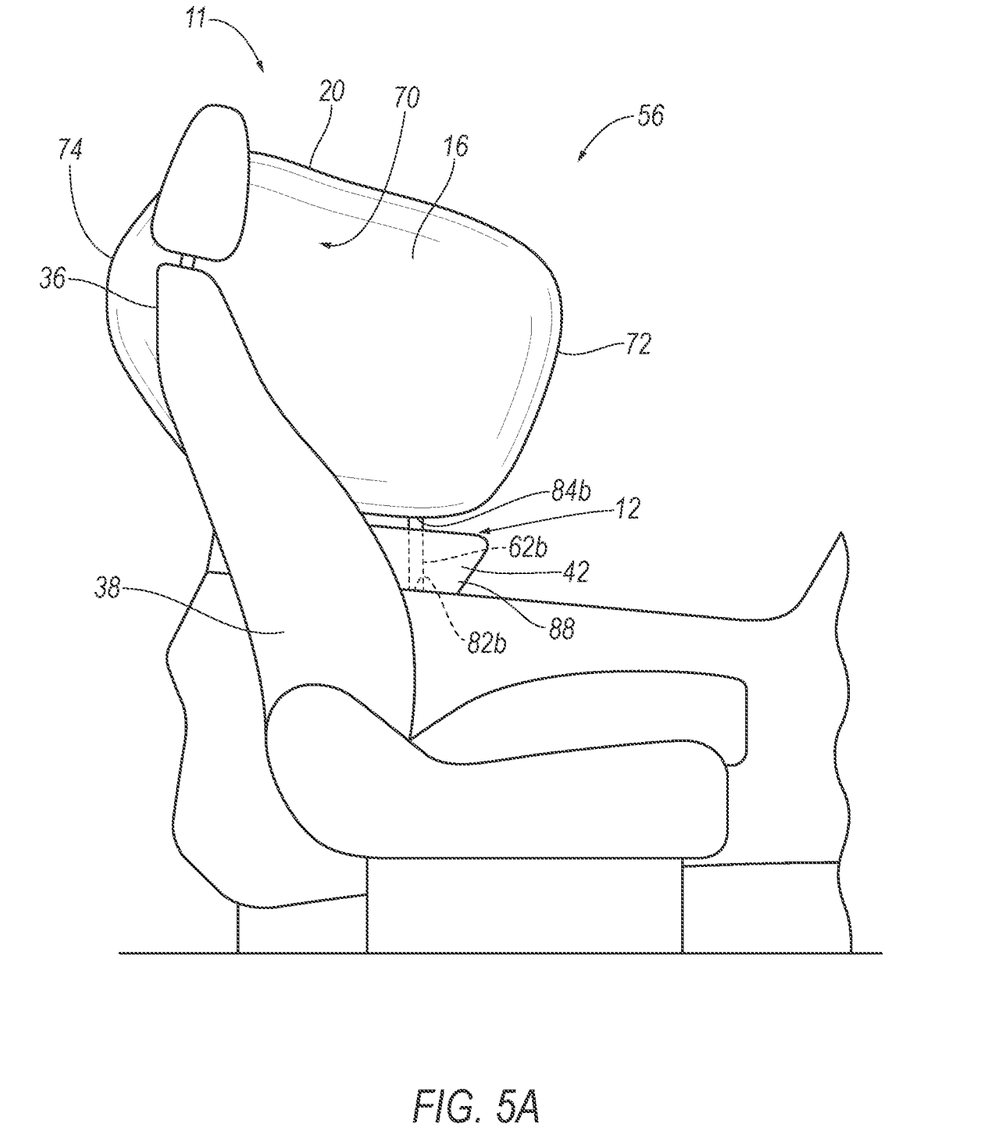
FIG. 5A is a side view of the airbag assembly in the inflated position.
Figure 5B:
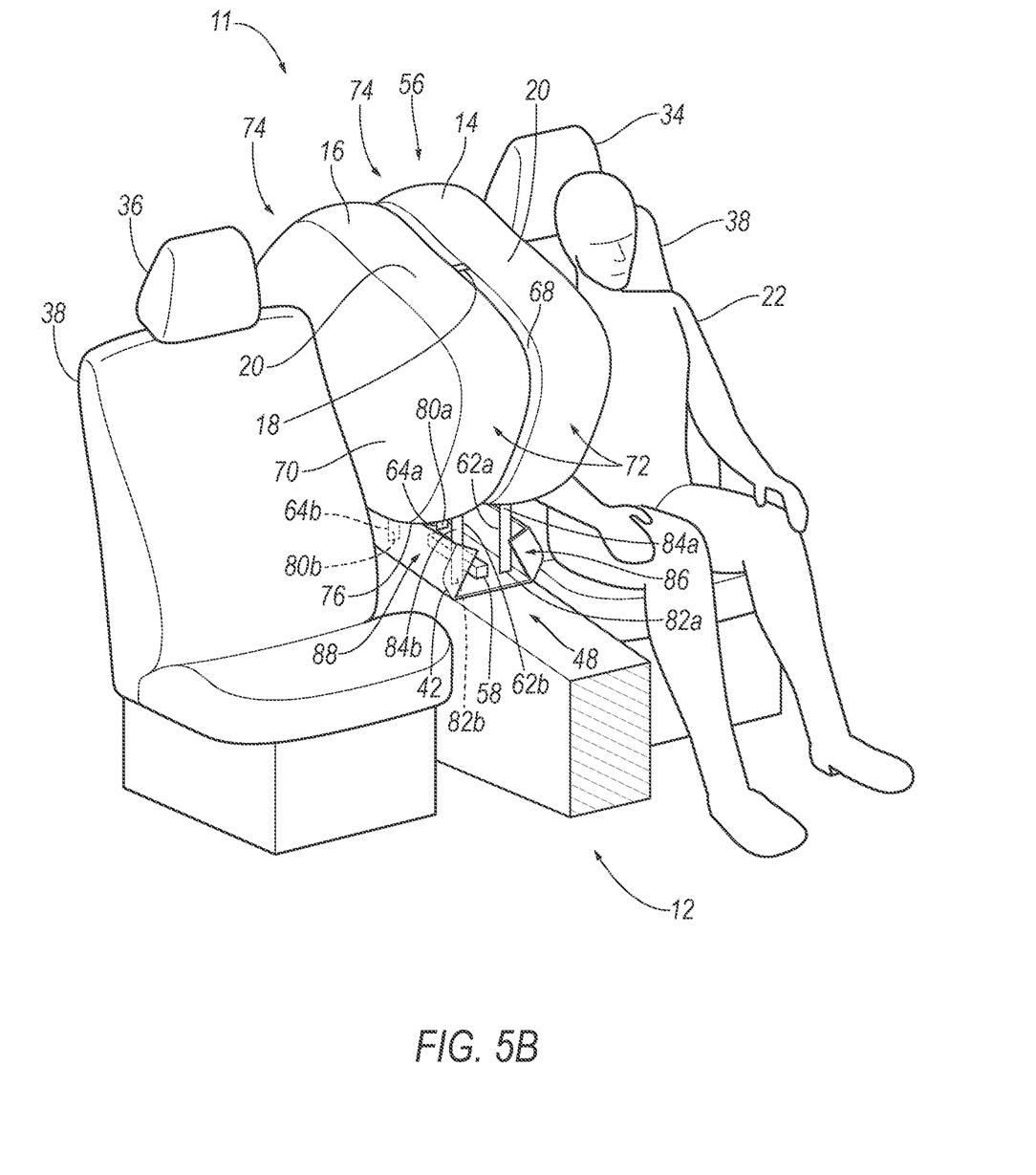
FIG. 5B is a perspective view of the airbag assembly in the inflated position from FIG. 5A.

The airbag assembly 56 may include the first rear tether 64a and the second rear tether 64b. As shown in the Figures, the first rear tether 64a and the second rear tether 64b are connected to the rear end 50 of the middle console 12. Specifically, the first rear tether 64a and the second rear tether 64b may have a first end 78a, 78b and a second end 80a, 80b. As shown in FIG. 5, the first end 78a of the first rear tether 64a and the first end 78b of the second rear tether 64b are connected to the rear end 50 of the middle console 12. The first rear tether 64a and the second rear tether 64b are arranged cross-vehicle relative to each other. Specifically, the first end 78a of the first rear tether 64a is connected to the rear end 50 of the middle console 12 on the first side 86 of the midline M and the first end 78b of the second rear tether 64b is connected to the rear end 50 of the middle console 12 on the second side 88 of the midline M. The first rear tether 64a and the second rear tether 64b may be connected to the rear end 50 of the middle console 12 by any suitable component, e.g., a rivet.

As shown in the Figures, the second end 80a of the first rear tether 64a is connected to the first airbag 14. Specifically, the second end 80a of the first rear tether 64a is connected to the rear side 74 of the first airbag 14. In the examples shown in the Figures, the second end 80b of the second rear tether 64b is connected to the second airbag 16. Specifically, the second end 80b of the second rear tether 64b is connected to the rear side 74 of the second airbag 16. The first rear tether 64a and the second rear tether 64b may be connected to the first airbag 14 and the second airbag 16, respectively, in any suitable manner, e.g., sewn, ultrasonic welding, adhesive, etc.

The airbag assembly 56 may include the first front tether 62a and the second front tether 62b. As shown in the Figures, the first front tether 62a and the second front tether 62b are connected to the front end 48 of the middle console 12. Specifically, the first front tether 62a and the second front tether 62b may have a first end 82a, 82b and a second end 84a, 84b. As shown in FIG. 5, the first end 82a of the first front tether 62a and the first end 82b of the second front tether 62b are connected to the front end 48 of the middle console 12. The first front tether 62a and the second front tether 62b are arranged cross-vehicle relative to each other. Specifically, the first end 82a of the first front tether 62a is connected to the front end 48 of the middle console 12 on the first side 86 of the midline M and the first end 82b of the second front tether 62b is connected to the front end 48 of the middle console 12 on the second side 88 of the midline M. The first front tether 62a and the second front tether 62b may be connected to the front end 48 of the middle console 12 by any suitable component, e.g., a rivet.

As shown in the Figures, the second end 84a of the first front tether 62a is connected to the first airbag 14. Specifically, the second end 84a of the first front tether 62a is connected to the front side 72 of the first airbag 14. In the examples shown in the Figures, the second end 84b of the second front tether 62b is connected to the second airbag 16. Specifically, the second end 84b of the second front tether 62b is connected to the front side 72 of the second airbag 16. In the manner described above with respect to the tether 18, the first front tether 62a and the second front tether 62b may be connected directly or indirectly to the first airbag 14 and the second airbag 16, respectively.

The airbag assembly 56 may be designed such that the first airbag 14 has a maximum deflection across the midline M on the second side. Specifically, as an example shown in the Figures, the airbag assembly 56 having a maximum deflection means the head of the occupant 22 remains at least 250 mm from the centerline L3 of the second seat 36 during a far side collision. In an example not shown in the Figures, the airbag assembly 56 may be designed such that the second airbag 16 has a maximum deflection across the midline M on the first side 86. The tether 18, the first front tether 62a, the second front tether 62b, the first rear tether 64a, and the second rear tether 64b, are designed to limit the deflection of the first airbag 14 and the second airbag 16. The limitation of deflection may be achieved through the size and shape of the first airbag 14 and the second airbag 16, size, shape, and location of the tethers 18, 62a, 62b, 64a, 64b, etc.

For example, the vehicle 10 may be subject to impact tests to test the kinematics of vehicle occupants 22 during a vehicle impact. Such tests may be standardized by various governmental or industry organizations. Standards Organizations may set criteria for passing such tests. As one example, the European New Car Assessment Program (EuroNCAP) includes a test to measure occupant 22 kinematics during a far side impact, e.g., kinematics of an occupant 22 in the driver seat during a side impact event on the passenger side or the kinematics of an occupant 22 in the passenger seat during a side impact event on the driver side. In this example, the test measures inboard motion of the head of the occupant, i.e., movement across the midline M.

Figure 6:
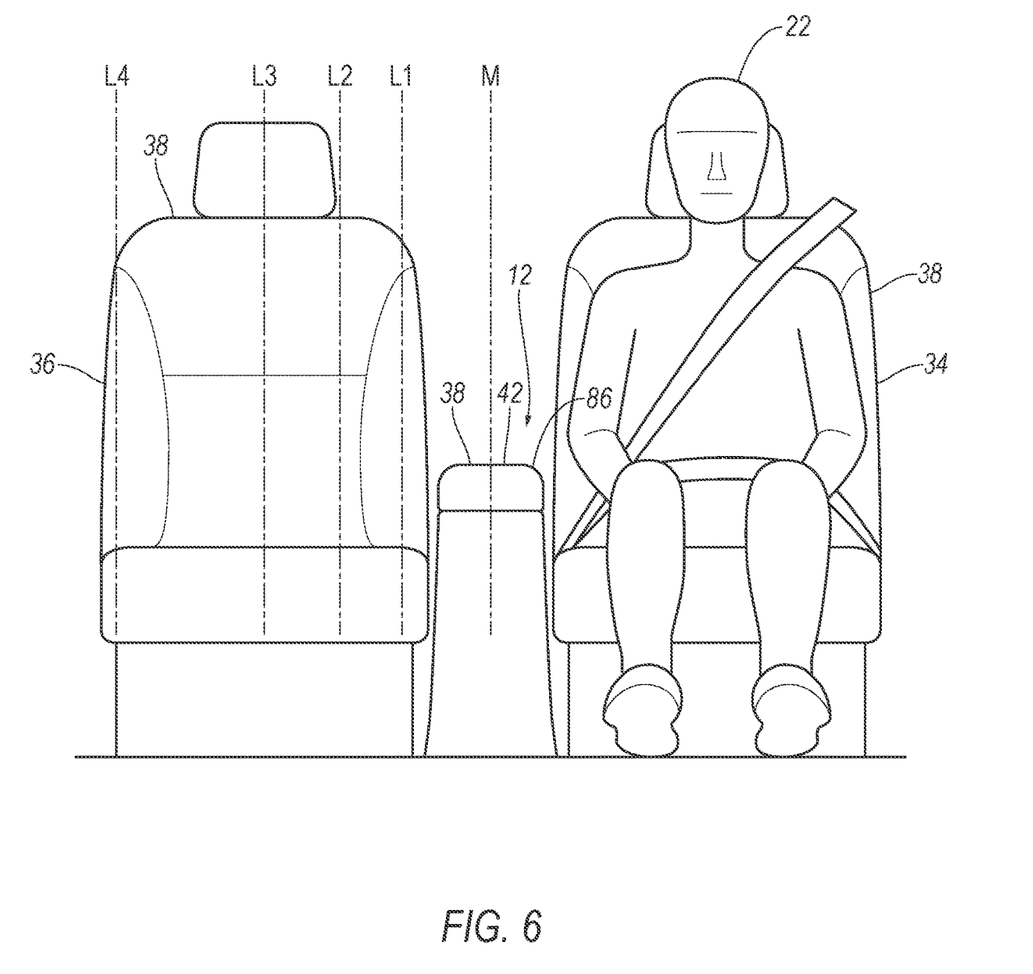
FIG. 6 is a front view of a seated occupant.

As an example, shown in FIG. 6, the criteria may be based on how far parts of an occupant 22 extend past a line, e.g., L1, L2, L3, L4. For example, the L1, L2, L3, and L4 lines correspond to the testing criteria of the EuroNCAP far side impact test. The L1 line corresponds to 250 mm inboard from the struck side seat centerline L3; the L2 line corresponds to 125 mm inboard of the struck side seat centerline L3; the L3 line corresponds to the struck side seat centerline L3; and the L4 line corresponds to the maximum post-test intruding point of the interior door panel.

In the present application, relative vehicular orientations and directions (by way of example, top, bottom, front, rear, outboard, inboard, inward, outward, lateral, left, right, etc.) is from the perspective of an occupant 22 seated in the vehicle 10 facing forward, e.g., toward a forward instrument panel and/or forward windshield of the vehicle 10. The forward direction of the vehicle 10 is the direction of movement of the vehicle 10 when the vehicle 10 is engaged in forward drive with wheels of the vehicle 10 straight. Orientations and directions relative to the airbag assembly 56 are given related to when the airbag assembly 56 is supported by the vehicle 10 as described below and shown in the Figures.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:
1. An assembly comprising:
a middle console;
a first airbag and a second airbag each supported by and inflatable upwardly from the middle console to an inflated position;
the first airbag and the second airbag each having a front side and a rear side;

the first airbag having a top between the front side and the rear side of the first airbag and the second airbag having a top between the front side and the rear side of the second airbag;

the tops being distal to the middle console in the inflated position; and a tether external to the first airbag and the second airbag, the tether connecting the top of the first airbag and the top of the second airbag.

2. The assembly of claim 1, further comprising a first rear tether and a second rear tether, the middle console having a rear end, the first rear tether being connected to the rear end and the first airbag and the second rear tether being connected to the rear end and the second airbag.

3. The assembly of claim 2, wherein the first airbag and the second airbag each have a rear side, the first rear tether being connected to the first airbag at the rear side of the first airbag and the second rear tether being connected to the second airbag at the rear side of the second airbag.

4. The assembly of claim 2, further comprising a first front tether and a second front tether, the middle console having a front end, the first front tether being connected to the front end and the first airbag and the second front tether being connected to the front end and the second airbag.

5. The assembly of claim 1, wherein the middle console includes an armrest, the first airbag and the second airbag inflatable upwardly from the armrest.

6. The assembly of claim 5, wherein the middle console includes a storage compartment below the armrest.

7. The assembly of claim 6, further comprising a hinge, the armrest being rotatable upwardly from the storage compartment about the hinge.

8. The assembly of claim 5, wherein the middle console includes a hinge, the armrest being rotatable about the hinge.

9. The assembly of claim 5, further comprising a first rear tether and a second rear tether, the armrest having a rear end, the first rear tether being connected to the rear end and the first airbag and the second rear tether being connected to the rear end and the second airbag.

10. The assembly of claim 9, wherein the first airbag and the second airbag each have a rear side, the first rear tether being connected to the rear side of the first airbag and the second rear tether being connected to the rear side of the second airbag.

11. The assembly of claim 9, further comprising a first front tether and a second front tether, the armrest having a front end, the first front tether being connected to the front end and the first airbag and the second front tether being connected to the front end and the second airbag.

12. The assembly of claim 1, further comprising a first seat and a second seat spaced from the first seat, the first airbag and the second airbag being inflatable between the first seat and the second seat.

13. The assembly of claim 12, wherein the middle console is between the first seat and the second seat.

14. The assembly of claim 1, wherein the first airbag and the second airbag are arranged in a cross-vehicle direction relative to each other.

15. The assembly of claim 1, further comprising an inflator in fluid communication with the first airbag and the second airbag.

16. The assembly of claim 1, wherein the first airbag has an inboard panel extending from the middle console to the top of the first airbag and the second airbag has an inboard panel extending from the middle console to the top of the second airbag, the inboard panels facing each other and being spaced from each other at the middle console.

17. The assembly of claim 1, wherein the first airbag abuts the second airbag when the first airbag and the second airbag are in the inflated position.

\* \* \* \* \*